Figure 9:
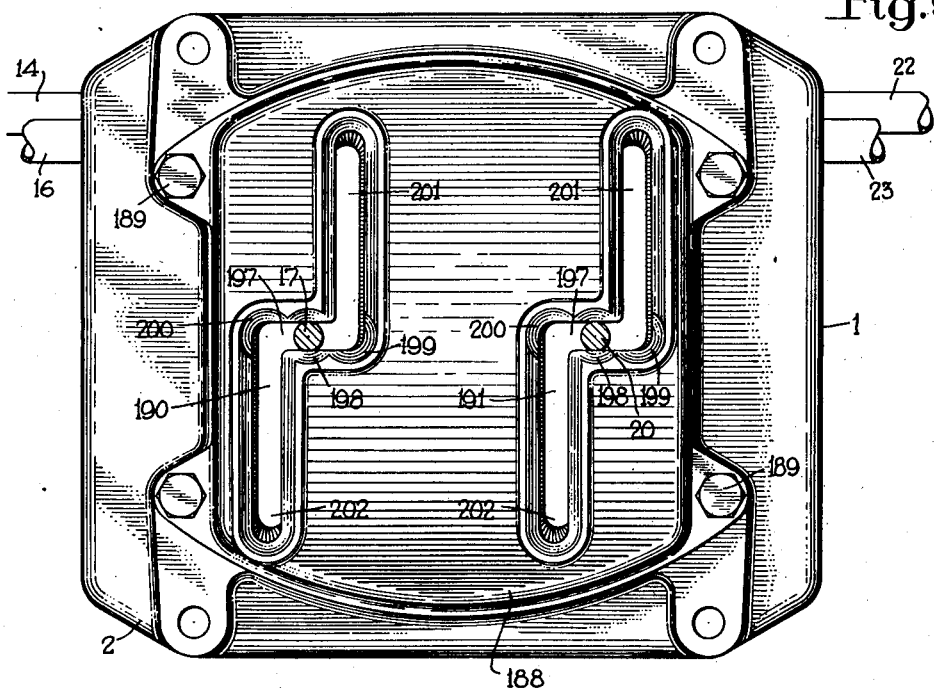

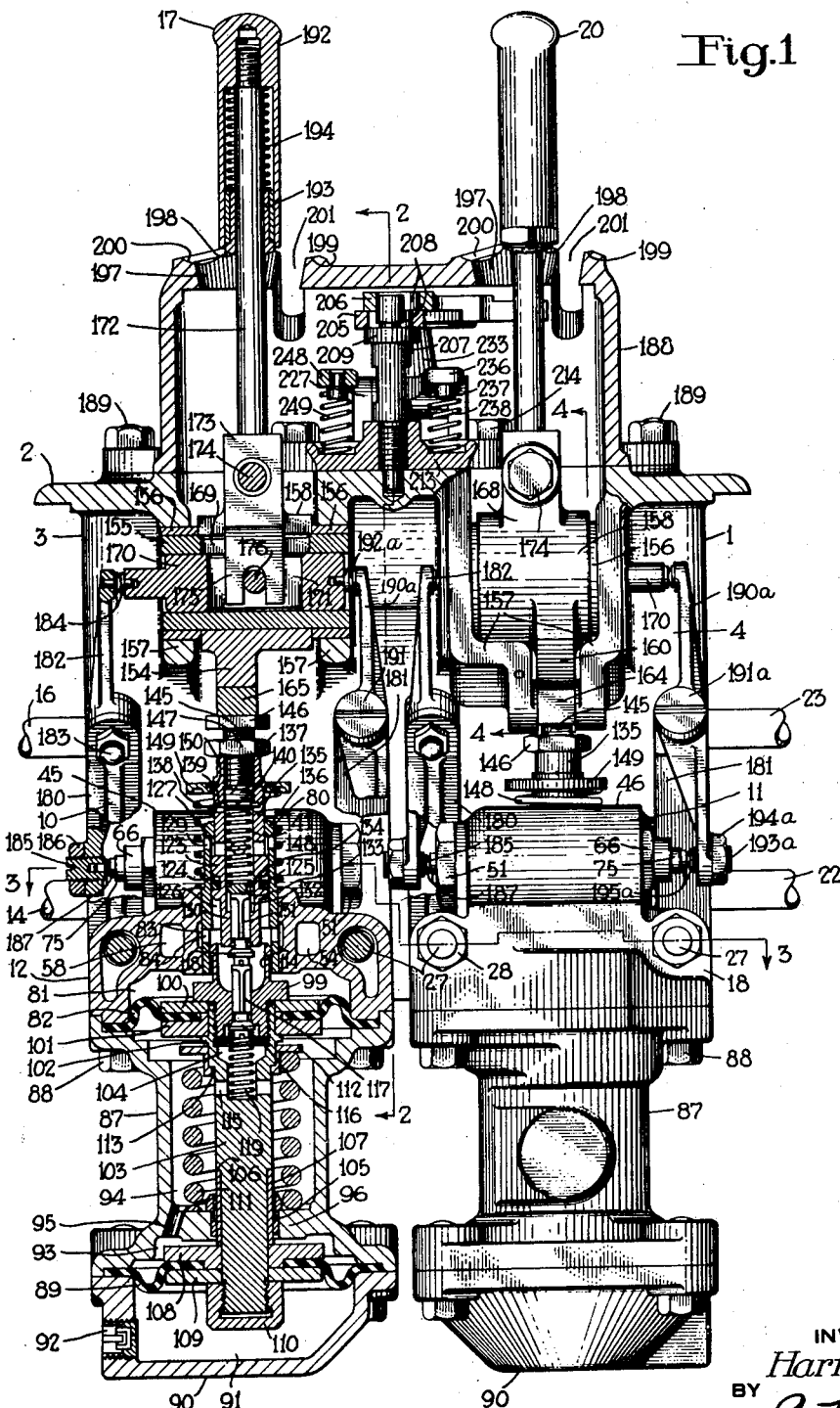

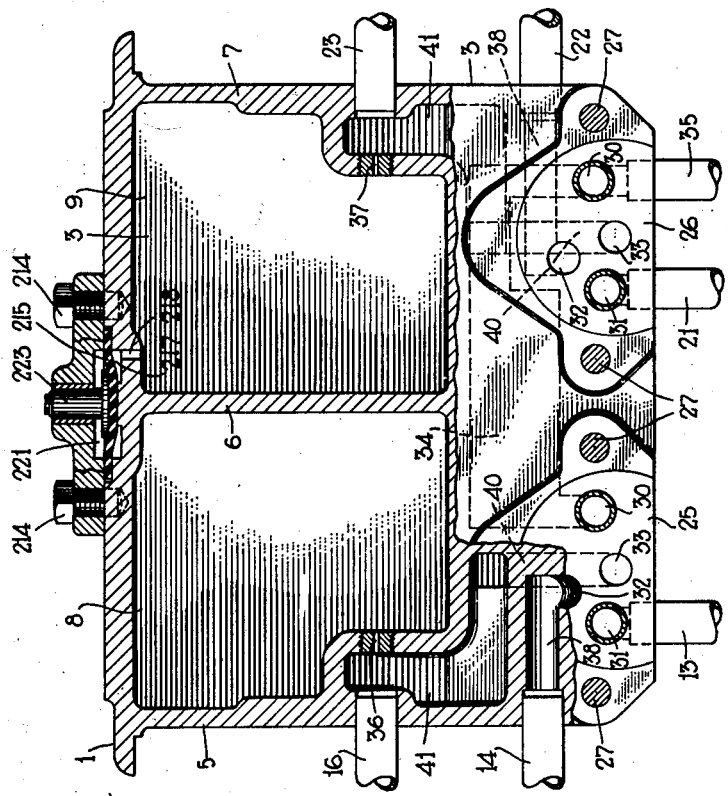
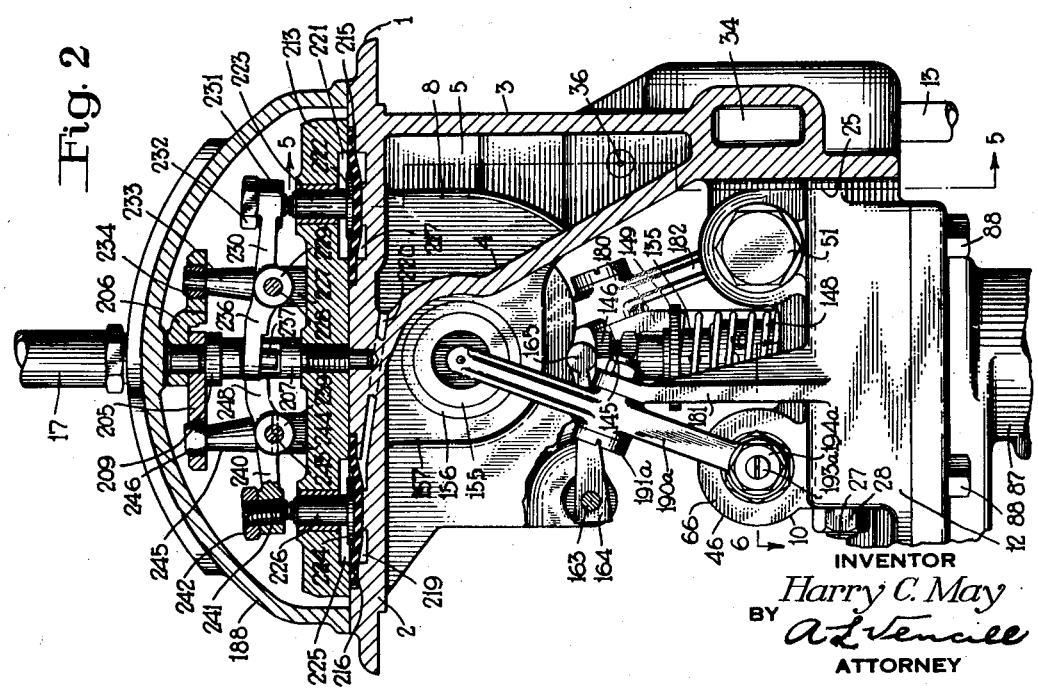

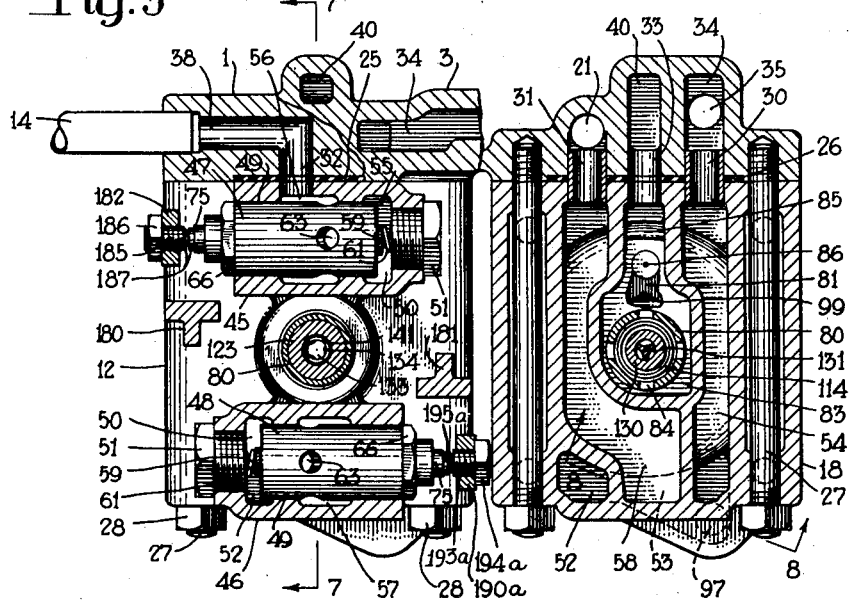
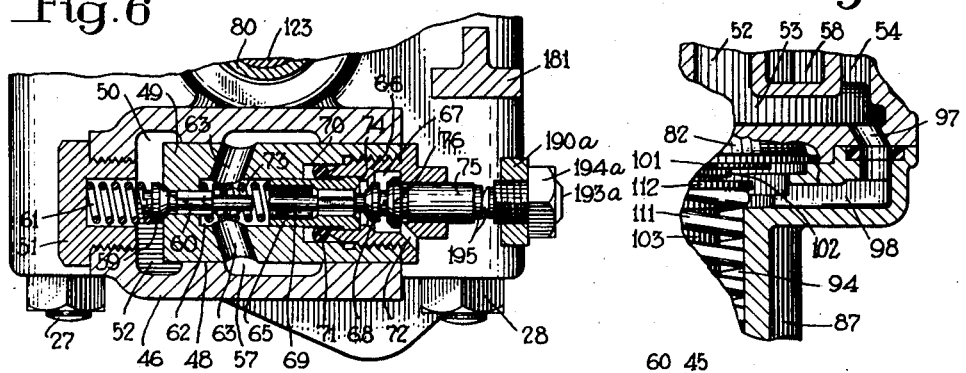
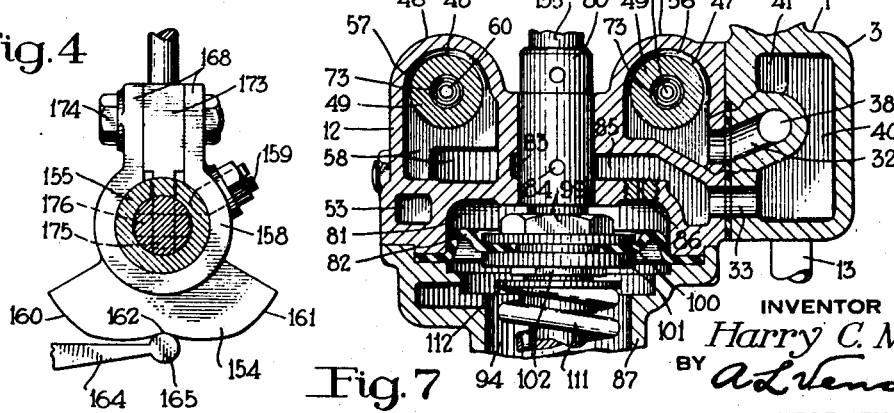

March 23, 1948. H. C. MAY 2,438,410
MANUALLY OPERATIVE SELECTIVE CONTROL DEVICE
Filed April 30, 1943 4 Sheets-Sheet 4

INVENTOR
Harry C. May
BY
ATTORNEY

Patented Mar. 23, 1948

2,438,410

UNITED STATES PATENT OFFICE 2,438,410

MANUALLY OPERATIVE SELECTIVE CONTROL DEVICE

Harry C. May, East McKeesport, Pa., assignor to The Westinghouse Air Brake Company, Wilmerding, Pa., a corporation of Pennsylvania Application April 30, 1943, Serial No. 485,114

4 Claims. (Cl. 74—471)

This invention relates to control devices and more particularly to a manually operative control device for selectively controlling a plurality of operations.

In the copending application of Roy R. Stevens, Serial No. 448,167, filed June 23, 1942, now Patent No. 2,426,063 issued August 19, 1947, and assigned to the assignee of the present application, there is disclosed a fluid pressure control mechanism for selectively controlling the positioning of a three position clutch element for connecting and disconnecting a prime mover, such as a Diesel engine, to and from a device to be driven, and for also controlling the speed or power output of said engine. The mechanism embodies a fluid motor controlled through two pipes for controlling the clutch element, while the engine speed or output is governed by a fluid motor controlled through one pipe, and a controller embodying a manually movable lever is provided for controlling the pressure of fluid in the different pipes for obtaining the desired operations.

One object of the invention is the provision of an improved manually operative controller for a control mechanism, such as above described.

In the mechanism above referred to, the three position clutch element has a forward drive position, a reverse drive position, and an intermediate or neutral non-driving position, while the lever in the manual controller has corresponding positions for selectively controlling the clutch element. The lever is movable beyond either of its two drive positions for accelerating the engine; operation of the engine at idling speed being provided for immediately adjacent the respective drive position, while operation at maximum speed is provided for at a point remote from the idling position. An interlock arrangement is associated with the manual controller to prevent acceleration of the engine while the clutch is disengaged. However, it is possible for an operator to move the manual control lever from, for instance, full speed forward position to full speed reverse position with such rapidity as to cause the clutch element to be actuated from its forward driving position to its reverse drive position, and thus reverse the drive connection between the engine and the driven device, before the speed of the engine can become reduced to a desired low degree. The same result may be obtained upon movement of the lever from full speed reverse position to full speed forward position. This possibility of reversal of the clutch element with the engine operating above a certain low speed, which may be even greater than idling speed, is objectionable in that parts of the clutch, of the engine, or of the device being driven may be damaged.

Another object of the invention is, therefore, the provision of a manually operative controller embodying means for preventing movement of the control lever from its forward position to its reverse position, or vice versa, until after the speed of the engine has become reduced to a desired low degree.

Still another object of the invention is the provision of an improved self-lapping valve device for regulating pressure of fluid for controlling the speed or power output of an engine or the like.

Figure 10:
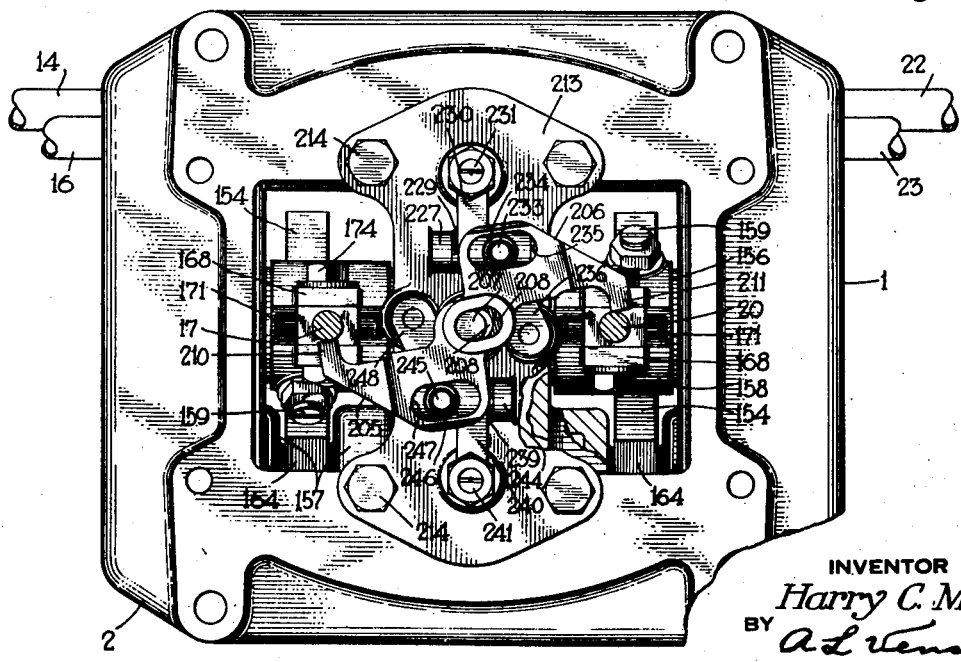

Other objects and advantages will be apparent from the following more detailed description of the invention:

In the accompanying drawings; Fig. 1 is a front view, partly in elevation and partly in section, of the improved manually operative controller; Figs. 2 to 4 are sectional views taken substantially on the lines 2—2, 3—3, and 4—4, respectively, in Fig. 1; Figs. 5 and 6 are sectional views taken substantially on the lines 5—5 and 6—6, respectively, in Fig. 2; Figs. 7 and 8 are sectional views taken substantially on the lines 7—7 and 8—8, respectively, in Fig. 3; Fig. 9 is a plan view of the controller; and Fig. 10 is a view like Fig. 9 but with a cover removed.

Description

As shown in the drawing the improved controller or control device comprises a substantially L-shaped body or bracket 1, the two legs 2 and 3 of which are joined together by a diagonally arranged wall 4 and three spaced walls 5, 6, and 7 arranged at right angles to the wall 4. The body legs 2 and 3 and walls 4, 5, and 6 cooperate to form within the body a fluid timing chamber 8, while said legs and the walls 4, 6, and 7 cooperate to form within said body another and separate fluid timing chamber 9.

The body 1 is common to and carries two like but otherwise separate and independent control devices 10 and 11 each of which may be arranged to control a three position clutch element for connecting and disconnecting an internal combustion engine to and from a device to be driven and for also controlling the fuel supply to and thereby the speed or power output of said engine.

The control device 10 comprises a valve mechanism 12 for controlling, through the medium of two pipes 13 and 14, the selective positioning of the respective clutch, and for also controlling, through the medium of a pipe 16, the fuel supply to and thereby the speed or power output of the respective engine, and a manually operative lever 17 for controlling said valve mechanism. The control device 11 comprises a valve mechanism 18, and a lever 20 for controlling said mechanism to control, through the medium of two clutch control pipes 21 and 22 and a speed control pipe 23, respectively, the clutch for and the speed of the respective engine, said parts being identical to those of the control device 10.

The body leg 3 is provided below the diagonal wall 4 with two mounting faces 25 and 26 against which the valve mechanisms 12 and 18, respectively, are secured by studs 27 and nuts 28.

Each of the mounting faces 25 and 26 has four openings 30, 31, 32 and 33 (Fig. 5) which are identically arranged for registration with corresponding openings in the cooperating face of the respective mechanisms 12 and 18. The openings 30 in the two faces are connected together by a passage 34 which is connected to a pipe 35 leading to any suitable source of fluid under pressure. The openings 31 in the two mounting faces 25 and 26 are connected to the clutch control pipes 13 and 21, respectively. The openings 32 in the two mounting faces are connected by passages 38 to the clutch control pipes 14 and 22, respectively. The openings 33 in the two mounting faces are connected by passages 40 and 41 to the two speed control pipes 16 and 23, respectively, the passage 41 open to pipe 16 being also connected through a choke or restricted port 36 to the timing chamber 8, while the corresponding passage connected to pipe 23 is connected through a like choke or restricted opening 37 with the timing chamber 9.

The two valve mechanisms 12 and 18 are identical in construction and each comprises a casing having two raised portions 45 and 46 which are spaced apart and arranged parallel to each other and to the top body leg 2, and in these two portions are disposed oppositely arranged selector valve devices 47 and 48, respectively. The selector valve devices 47 and 48 in valve mechanism 12 are provided for controlling the supply and release of fluid under pressure to and from the clutch control pipes 14 and 13, respectively, while those in the valve mechanism 18 are provided for controlling the supply and release of fluid under pressure to and from the clutch control pipes 22 and 21, respectively.

Each of the selector valve devices 47 and 48 comprises a valve cage 49 in the form of a sleeve pressed into the casing with one end of the sleeve aligned with one end of the respective raised portion of the casing, while the opposite end terminates in a chamber 50 in axial alignment with an opening closed by a cap nut 51. The chamber 50 in the selector valve device 48 is connected through passages 52 and 53 to a passage 54 which leads to the fluid pressure supply opening 30 in the respective mounting face 25 or 26, and adjacent the connection with said opening the passage 54 is also connected by a passage 55 to chamber 50 in the selector valve device 47.

The valve cage 49 in each selector valve device 47 is encircled by an annular cavity 56 provided intermediate the ends of the cage, and this cavity is open to the opening 32 in the respective mounting face 25 or 26 and thereby to the clutch control pipe 14 or 22. The valve cage 49 in each selector valve device 48 is also encircled by a like annular cavity 57 which is open through a passage 58 to the opening 31 at the respective mounting face 25 or 26 and thereby to the clutch control pipes 13 or 21.

Each chamber 50 contains a fluid pressure supply valve 59 having a fluted stem 60 mounted to slide in a suitable bore provided axially in the valve cage 49, said cage having a seat arranged for cooperation with said valve. A spring 61 in each chamber 50 is interposed under pressure between the respective supply valve 59 and cap nut 51 for urging said valve to its closed position shown in Fig. 6. The stem 60 of each supply valve 59 extends into a bore 62 which is open through a plurality of passages 63 in the valve cage to the exterior thereof for registration with the annular cavity 56 in the selector valve device 47 and with the annular cavity 57 in the selector valve device 48.

In each of the selector valve devices, a sleeve 65 has one end slidably mounted in bore 62 while the opposite end is mounted to slide in an aligned bore provided in a cap nut 66 which is secured in one end of the valve cage, and within this cap nut beyond the outer end of said sleeve is a chamber 67 containing a release valve 68 arranged to seat opposite to the supply valve 59 and having a stem 69 extending through the sleeve in the direction of the valve stem 60 and in alignment therewith.

Each cage member 49 has a bore 70 beyond the inner end of cap nut 66 and encircling the sleeve 65, and interposed in the space between and having contact with the wall of said bore and with said sleeve is a ring-like sealing member 71. This member 71 is provided for preventing leakage of fluid under pressure from bore 62 past the exterior of sleeve 65 to chamber 67 and thence to atmosphere through a passage 72, but at the same time will allow movement of the sleeve 65 in the direction of or away from the supply valve 59. A coil spring 73 disposed in bore 62 around the end of the supply valve stem 60 is interposed between and bears against the end wall of said bore and the adjacent end of sleeve 65. This spring is under pressure and therefore constantly effective for urging said sleeve in a direction away from the supply valve 59 to a normal position such as shown and as defined by contact of said sleeve with a shoulder 74 in the cap nut 66.

A plunger 75 is slidably mounted in a suitable bore through the end of each cap nut 66 in axial alignment with the two valves 68 and 59. This plunger is provided in chamber 67 with a head 76 one side of which is arranged to engage the release valve 68 while the opposite side is provided for engaging the cap nut 66 to secure same against moving out of the cap nut.

In operation, movement of the plunger 75 in each selector valve device inwardly will first cause movement of the release valve 68 relative to sleeve 65 into contact with a seat provided on the adjacent end of said sleeve, this relative movement obtained due to the action of spring 73 on sleeve 65 opposing movement thereof. In this seated position of the release valve 68, in which communication is closed between the atmospheric port 72 and bore 62 the end of the release valve stem 69 is still preferably slightly out of contact with the stem 60 of the supply valve 59, whereby the latter valve is also seated. Upon further inward movement of plunger 75 and thereby of the release valve 68, the sleeve 65 will be moved therewith and the release valve stem 69 will engage the supply valve stem 60 whereby further inward movement of the plunger 75 will then open the supply valve 59 which will allow fluid under pressure to flow from the supply chamber 50 to bore 62. When pressure is relieved on plunger 75, the action of spring 61 on the supply valve 59 and the action of spring 73 on the end of sleeve 65 will move the parts in the direction of the right-hand as viewed in Fig. 6. After a slight degree of such movement, the supply valve 59 will seat and close communication between the fluid pressure supply chamber 50 and bore 62, it being noted that at this time the release valve 68 is still seated against the end of sleeve 65. Upon further release of actuating force on plunger 75, spring 62 by itself will then return the sleeve 65 to its normal position shown, and defined by contact with shoulder 74, following which pressure of fluid in bore 62 will force the release valve 68 from its seat for thereby opening said bore to the atmospheric port 72 for releasing fluid from said bore. With this improved structure it will be noted that the release valve 68 and supply valve 59 are never both open at the same time. Each valve is closed ahead of opening of the other, thereby insuring against undesired flow of fluid under pressure from supply chamber 50 past the supply valve 59 to bore 62 and thence past the release valve 68 and through passage 72 to the atmosphere.

From the above description it will now be seen that in valve mechanism 12 when plunger 75 in the selector valve device 47 is moved inwardly to open the supply valve 59 fluid under pressure will be supplied to the clutch control pipe 14, while upon return of said plunger to its normal position shown said pipe will be opened to the atmosphere. Likewise, in the selector valve device 48, inward movement of plunger 75 will open the supply valve 59 therein to supply fluid under pressure to pipe 13 while the return of said plunger to its normal position shown will open said pipe to the atmosphere. The same result is obtained with respect to the clutch control pipes 21 and 22 upon operation of the selector valve devices 47 and 48 in the valve mechanism 18 as will be readily apparent. It will be noted that since in all of the selector valve devices one valve is closed ahead of opening of the other, the respective clutch control pipe will therefore either be at atmospheric pressure or be changed to the full pressure provided in the respective supply valve chamber 50 to thereby insure positive operation of the device to be controlled.

As before mentioned the two selector valve devices 47 and 48 in each of the valve mechcanisms 12 and 18 are oppositely arranged, that is, the plunger 75 in one of said devices projects from one end of the raised portion 45 of the casing, while the plunger 75 of the other selector valve device projects from the opposite end of the raised portion 46.

In each valve mechanism 12 and 18 between the two raised portions 45 and 46 the casing is provided with a bore lined with a sleeve 80 one end of which extends above the casing while the opposite end opens to a pressure chamber 81 formed above a flexible diaphragm 82. Above chamber 81 is an annular cavity 83 encircling the sleeve 80 and open through a plurality of ports 84 in said sleeve to the interior thereof. The cavity 83 is also open to a passage 85 which leads to opening 33 in the mounting face 25 or 26 and thence to the respective speed control pipe 16 or 23. The chamber 81 is connected through a stabilizing choke 86 to the passage 85.

The diaphragm 82 is arranged in coaxial relation with the sleeve 80 and is clamped around its edge between the casing of the valve mechanism and the adjacent end of a casing section 87, these two parts being secured together by cap screws 88. An oppositely arranged and axially aligned flexible diaphragm 89 of substantially the same area as diaphragm 82 is clamped around its edge between the opposite end of casing section 87 and a cover 90. A chamber 91 is formed between the diaphragm 89 and cover 90 and is in constant communication with the atmosphere through a breather opening provided in an insect excluder 92. The adjacent faces of the two diaphragms 89 and 82 are open to chambers 93 and 94 respectively, which are in permanent communication with each other through a passage 95 provided in an annular rib 96 extending inwardly from the casing section 87 above the diaphragm 89. In use, chamber 94 and thereby chamber 93 are constantly supplied with fluid under pressure from the fluid pressure supply pipe 35 by way of opening 30 in the mounting face 25 or 26 and thence through passages 54, 53, and a passage 97 in the casing which registers with a passage 98 in the casing section 87, the latter passage leading to chamber 94 as shown in Figs. 3 and 8.

The central portion of diaphragm 82 is clamped between two followers 100 and 101, the follower 101 engaging a collar 102 provided on a stem 103 which extends through chamber 94 and through said followers and diaphragm into chamber 81. A nut 99 disposed in chamber 81 has screw-threaded engagement with the wall of a bore 104 provided in the end of stem 103 and is tightened against the follower 100 for clamping the two followers to the opposite faces of the diaphragm 82 and for thereby securing the one end of stem 103 to said diaphragm.

The rib 96 has a bore lined with a wear bushing 105 arranged in axial alignment with the two diaphragms, and the stem 103 extends through this bushing and centrally through the diaphragm 89 into chamber 91. Above the rib 96 the stem 103 is reduced in section to provide a shoulder 106, and a wear sleeve 107 is mounted on this reduced portion of the stem with one end in engagement with said shoulder. The sleeve 107 extends through the bushing 105 in sliding contact therewith and its opposite end contacts a follower 108 which is disposed in chamber 93 in contact with the upper side of diaphragm 89. The stem 103 extends through the follower 108 and a follower 109 mounted against the opposite side of the diaphragm 89, and a nut 110 provided on the end of stem 103 within chamber 91 is tightened against the follower 109 clamping same centrally to one side of the diaphragm 89 and thereby securing the follower 108 against the opposite side of said diaphragm.

In chamber 94 the rib 96 supports one end of a control spring 111 the opposite end of which bears against an annular spring seat 112 which is slidably mounted on stem 103 and urged by said spring into contact with a shoulder 113 on said stem. The spring 111 is preferably fully expanded with the parts of the device in the position shown in Fig. 1 and is operative to oppose downward movement of the stem 103 and thereby of diaphragms 82 and 89 from this position, as will be later described.

The nut 99 above the diaphragm 82 has an upwardly extending sleeve-like projection 114, the end of which is mounted to slide in the lower and adjacent end of sleeve 80 below the ports 84. The bore 104 in the diaphragm connecting stem 103 is in permanent communication through one or more bores 115 with chamber 94 and contains a fluid pressure supply valve 116. This valve has a fluted stem 117 extending through an axial bore in the nut into the sleeve-like projection 114 thereof, wherein it contacts a fluid pressure release valve 118. The nut 99 is provided in bore 104 with a seat for engagement by the supply valve 116 and a spring 119 contained in said bore acts on said valve for urging same into contact with said seat.

A plunger 123 is slidably mounted in sleeve 80 above the release valve 118 and is provided with an annular groove 124 containing a sealing ring 125 contacting the bottom of said groove and the inner wall of said sleeve for preventing leakage of fluid under pressure from a chamber 126 below the plunger to an annular chamber 127 above the plunger. The chamber 126 is in permanent communication with the interior of the projection 114 of nut 99 and through the ports 84 with the annular cavity 83 encircling the sleeve. The chamber 127 above the plunger 123 is in constant communication with the atmosphere through one or more radial ports 129 provided in the sleeve 80.

The plunger 123 has a portion 130 of reduced section depending therefrom into chamber 126 and provided with an axial bore opening through a valve seat on its lower end which seat is provided for engagement by the release valve 118. The release valve has a fluted stem 131 extending through this seat and bore into a bore 132 of larger diameter in which there is slidably mounted a spring seat 133 having one or more openings 134 adjacent its peripheral edge connecting the spaces at the opposite sides of said seat.

The plunger 123 also has an upwardly projecting portion 135 of reduced section extending through chamber 127 and in sliding engagement with an inturned collar 136 provided at the upper end of sleeve 80. The bore 132 extends to a point above the collar 136 where it joins a screw-threaded bore 137. Just below the end of the screw-threaded bore 137 the portion 135 of the plunger has two oppositely arranged radial bores 138 in which are disposed pins 139 extending from opposite ends of a cylindrical spring seat 140 which is of slightly smaller diameter than bores 138 so that said seat may be inserted into bore 132 through either of the bores 138. A coil spring 141 is disposed in bore 132 under pressure and acts at one end on the spring seat 133 and at the opposite end on spring seat 140, this spring biasing the release valve 118 to its open position shown and moving the spring seat 140 upwardly until the pins 139 engage the uppermost portions of bores 138 in which position the spring seat 140 is held against longitudinal movement and thus secured within the bore 132.

An operating screw 145 is threaded into bore 137 in the upper end of the plunger projection 135 and on its outer end is provided with a head 146. A lock nut 147 mounted on screw 145 is arranged to engage the end of the extended portion 135 of the plunger for securing the screw 145 in an adjusted position. A coil bias spring 148 encircles the portion of sleeve 80 extending above the casing and is supported at one end on said casing and the opposite end bears against a ring-shaped seat 149 secured on the extended portion 135 of the plunger by any suitable interlocking means 150. This spring is under relatively light pressure for biasing the plunger 123 in an upwardly direction and out of seating contact with the release valve 118.

In the operation of each of the valve mechanisms 12 and 18, the head 146 of the actuating screw 145 and thereby plunger 123 are arranged for downward movement from a normal position shown by means to be later described, and for return movement upwardly to said normal position by spring 148 upon release of said means.

In each of the valve mechanisms 12 and 18, when the screw head 146 and plunger 123 are in the normal positions shown spring 119 will seat the supply valve 116 and spring 141 acting on stem 131 of the release valve 118 will maintain said release valve in contact with the end of the supply valve stem 117 and thus unseated from the end of the plunger portion 130. As a result, chamber 126 below the plunger 123 and thereby the annular cavity 83, passage 85, and chamber 81 above the diaphragm 82 will be also open to the atmosphere past the release valve 118. Since the speed control pipe 16 and timing chamber 8 are open to passage 85 in the valve mechanism 12, and the speed control pipe 23 and timing chamber 9 are open to passage 85 in the valve mechanism 18, these pipes and chambers will also be open to the atmosphere with the plungers 123 in the two valve mechanisms, in their normal positions shown.

If through the medium of the actuating screw head 146, the plunger 123 in either valve mechanism 12 or 18 is moved downwardly against the light biasing force of spring 148, by means to be later described, the movement will be relative to the release valve 118 until the seat for said valve on the portion 130 of plunger 123 engages the valve for closing communication between chamber 127 which is open to atmosphere, and chamber 126 and thus the connected diaphragm chamber 81 and the respective speed control pipe 16 or 23, and timing chamber 8 or 9. Further downward movement of the actuating screw 145 will then move the release valve 118 with the plunger 123 and the release valve will act through stem 117 of the supply valve to unseat the latter from the end of nut 99 secured to diaphragm 82.

When the supply valve 116 is thus opened, fluid under pressure will flow from the supply chamber 94 past said valve to chamber 126, and thence to the respective speed control pipe and timing chamber and also through the stabilizing choke 86 to chamber 81 above the diaphragm 82. The stabilizing choke 86 is provided to prevent the pressure in diaphragm chamber 81 increasing substantially ahead of the increase in pressure in the respective speed control pipe.

The pressure of fluid thus supplied to chamber 81 acts on diaphragm 82 in opposition to the force of control spring 111, and when this pressure is increased to a degree which overcomes the force of said spring, the diaphragm 82 will deflect in a downwardly direction relative to the supply valve 116 and finally move into seating engagement therewith when the pressure in chamber 81 and thereby in the respective speed control pipe and timing chamber is increased to a degree determined by the extent of such downward movement of the adjusting screw 145 after seating engagement with the release valve 118. It will thus be seen that the supply valve 116 will be seated to limit the supply of fluid to and thereby the pressure of such fluid in the respective speed control pipe and timing chamber in accordance with the position of the adjusting screw 145 or the degree of movement of the supply valve 116 from its normal position shown.

If it is desired to increase the pressure of fluid in speed control pipe and timing chamber the adjusting screw 145 is moved further in a downwardly direction and this movement will again unseat the supply valve 116 to allow further flow of fluid under pressure from chamber 94 to said speed control pipe and timing chamber and also to diaphragm chamber 81. When the pressure of fluid in the speed control pipe and timing chamber and in diaphragm chamber 81 is then increased to a degree sufficient for deflecting the diaphragm 82 downwardly against spring 111 to a position for again seating the supply valve 116, the flow of fluid will be cut off to thereby again limit the pressure attained in said pipe in accordance with the new position of the actuating screw 145 and supply valve 116.

It will thus be apparent that the pressure in either speed control pipe and thereby in the respective timing chamber can be increased in any increments desired in accordance with the extent of downward movement of the respective adjusting screw 145, from the normal position shown, or if desired, a maximum degree of pressure can be attained in said pipe and chamber by movement of screw 145 to a position in which the spring seat 149 on the extension 135 of the plunger is in substantial engagement with the end of sleeve 80.

If after fluid pressure is supplied to the speed control pipe and timing chamber it is desired to reduce the pressure therein, then the adjusting screw 145 may be allowed to move upwardly under the action of spring 148. With the diaphragm 82 in a balanced condition by the pressure of fluid in chamber 81 and the opposing pressure of spring 111, this upward movement of the adjusting screw 145 and thereby of the plunger 123 will be relative to the release valve 118, since said valve will be maintained in contact with the supply valve stem 117 by the pressure of spring 140. As a result, the portion 130 of the plunger 123 will move out of seating engagement with the release valve 118 to thereby allow fluid under pressure to flow from the respective speed control pipe and timing chamber, and chamber 81 above the diaphragm 82 to atmosphere. The pressure of fluid in diaphragm chamber 81 acting on diaphragm 82 and opposing that of spring 111 will therefore be reduced and said spring will accordingly deflect the diaphragm 82 upwardly in accordance with the degree of such reduction. As the diaphragm 82 is thus moved upwardly, the supply valve 116 and release valve 118 will be moved therewith by spring 119 in the direction of the reduced portion 130 of plunger 123.

The pressure of fluid in diaphragm chamber 81 and thereby in the connected speed control pipe and timing chamber will thus continue to reduce until the release valve 118 is moved into engagement with its seat in case the plunger 123 is only returned part way toward its normal position. This seating of the release valve 118 will then prevent further flow of fluid under pressure from chamber 81 above the diaphragm 82 and thereby from the speed control pipe and timing chamber, thus limiting the pressure in said pipe and chamber to a degree determined by the position of plunger 123 and the regulating screw 145.

If it is desired to make a further reduction in pressure in either speed control pipe and timing chamber, the respective adjusting screw 145 may be allowed to move upwardly to a further degree for again unseating the release valve 118. A further release of fluid under pressure will then occur from the speed control pipe, timing chamber, and diaphragm chamber 81, and the diaphragm 82 will again move upwardly for seating the supply valve 118 to limit such reduction when the pressure in said pipe becomes reduced to a degree determined by the new position of the adjusting screw 145. It will thus be seen that the pressure in the speed control pipe may be reduced in any desired increments in accordance with the extent of upward movement of the adjusting screw 145 back toward its normal position. When the adjusting screw 145 is allowed to return to its normal position, a complete release of fluid under pressure from the speed control pipe and timing chamber and diaphragm chamber 81 will occur since at the time the pressure in said pipe becomes reduced to substantially atmospheric pressure the spring 111 will be fully expanded and thereby allow spring 140 to maintain the release valve 118 open.

In case the pressure provided in either speed control pipe and the respective diaphragm chamber 81 is of a maximum degree and it is desired to reduce the pressure therein to atmospheric pressure in one step, the adjusting screw 145 will be allowed to be returned to its normal position by spring 148 under which condition a continuous and complete release of fluid under pressure from said pipe and chamber will occur, as will be apparent.

The choke 36 between the speed control pipe 16 and timing chamber 8, and the corresponding choke 37 between the speed control pipe 23 and timing chamber 9 act upon operation of the respective valve mechanisms 12 and 18 to supply fluid under pressure to said pipes, to delay the charging of said chambers so as to obtain prompt increase in pressure in said pipes, while upon release of fluid under pressure from said pipes, these chokes are effective to delay the release of fluid under pressure from said chambers with respect to the release from said pipes for reasons which will be hereinafter brought out.

As hereinbefore mentioned, two levers 17 and 20 are provided to control the valve mechanisms 12 and 18, respectively. These levers and their operating connections with the valve mechanisms 12 and 18 are identical and the following description of the former will therefore apply to both.

A sleeve-like operating shaft 155 arranged at right angles to the axis of the plunger actuating screw 145 and having its axis intersected by an extension of the axis of said screw is journaled in the body 1 in two spaced bearings 156 provided in two spaced lugs 157 projecting from the diagonal wall 4 of the body. A sleevelike member 158 slidably mounted on shaft 155 between the bearings 156 is secured to said shaft against longitudinal movement by a set screw 159. Projecting from the side of member 158 adjacent the regulating screw 145 is a cam 154 having two reversed but otherwise identical peripheral cam surfaces 160 and 161 joined together by a depression 162. Beyond the bearings 156 the two lugs 157 carry a journal pin 163 (Fig. 2) on which is pivotally mounted one end of a follower arm 164. The opposite end 165 of arm 164 is cylindrical in form and disposed between and engaged on opposite sides by the head 146 of the regulating screw 145 and the peripheral surface of cam 154.

When the member 158 and cams 154 are in their normal or neutral position as shown in the drawing, the cam 154 is positioned to allow the cylindrical end 165 of the follower arm 164 to enter recess 162, and the spring 148 acting through spring seat 149 on the plunger extension 135 is thus allowed to move said plunger and the adjusting screw 145 to their normal position shown in Fig. 1 and above described. Upon rocking of the shaft 155 and thereby member 158 in a clockwise direction from their normal position, as viewed in Fig. 4, the cam surface 161 is arranged to act through the end 165 of the follower arm 164 to move the regulating screw 145 in a downwardly direction an extent corresponding to the degree of such rocking. Return of the shaft 155 and member 158 toward or to their normal position will position the cam surface 161 with respect to the follower arm 164 to allow the regulating screw 145 to be moved upwardly and toward its normal position in accordance with the extent of movement of said member toward its normal position. Identical operation or positioning of the adjusting screw 145 will be attained by cam surface 160 upon rocking of shaft 155 and member 158 in the opposite direction from normal or neutral position, as will be readily apparent.

Opposite the recess 162 between the two cam surfaces 160 and 161 the member 158 is provided with two outstanding ears 168 which are spaced apart, and aligned with and opening to such space is a slot 169 provided longitudinally through one side of the operating shaft 155. A plunger 170 is slidably mounted in the shaft 155 and has a slot 171 extending diametrically therethrough and aligned with slot 169 in the shaft 155.

The operating lever 17 comprises a bar 172 having at its inner end a rectangular portion 173 disposed between and having substantial sliding contact with the adjacent faces of the two ears 168. A bolt 174 extends through the two ears 168 and the portion 173 of the lever securing these parts together. A tongue 175 projects from the inner end of the portion 173 of the lever through the slot 169 in shaft 155 and into the slot 171 in the plunger 170 and therein is provided with a jaw which straddles a pin 176 secured to said plunger in the opposite side walls of slot 171. The connection above described between the lever 17 and the two ears 168 projecting from the cam member 168 provide for operation of cam 154 by movement of the lever 17 in either direction from neutral position, shown in Figs. 1, 2, and 4, circumferentially of the operating shaft 155, for thereby controlling the operation of the self-lapping valve mechanism including the operating screw 145 and plunger 123. The bolt 174 securing the lever to the two ears 168 also provides for movement of lever 17 in either direction from its neutral position lengthwise of the shaft 155 for thereby moving the plunger 170 in either one direction or the opposite direction within and longitudinally of said shaft.

The casing of the valve mechanism 12 is provided adjacent the opposite ends of the cylindrical raised portions 45 and 46 with two upstanding arms 180 and 181. A lever 182 is pivoted intermediate its ends on a screw 183 secured in the end of arm 180. This lever is diagonally arranged with one end in operating alignment with one end of the plunger 170 while the opposite end is in operating alignment with plunger 75 of the selector valve device 47. Wear buttons 184 are provided in the adjacent ends of lever 182 and plunger 170 for wear contact with each other. In the opposite end of the lever 182 is a screw-threaded adjusting pin 185 in axial alignment with the plunger 175 of the selector valve device and secured in an adjusted position in said lever by a lock nut 186. Wear buttons 187 are provided in the adjacent ends of the adjusting screw 185 and plunger 75 for contact with each other.

A lever 190a like the lever 182 and also disposed diagonally but in a different direction is pivoted intermediate its ends on a screw 191a secured in the upper end of the arm 181. One end of this lever is arranged for operation by plunger 170 through the medium of wear buttons 192a provided in the adjacent ends of said lever and plunger for contact with each other. In the opposite end of said lever is an adjusting screw 193a arranged in alignment with plunger 75 in the selector valve device 48. This screw is held in an adjusted position by a lock nut 194a engaging the lever, and in the adjacent ends of said screw and plunger 75 are wear buttons 195a for operating contact with each other.

With the structure just described, it will be seen that if the operating lever 17 is rocked about the bolt 174 in a clockwise direction as viewed in Fig. 1 the plunger 170 will be operated to actuate the lever 182 for operating, in the valve mechanism 12, the selector valve device 47 to supply fluid under pressure to the clutch control pipe 14 while allowing the lever 190a and selector valve device 48 to remain in the condition shown opening the clutch control pipe 13 to the atmosphere. Return of the lever 17 to its vertical position shown in Fig. 1 will actuate the plunger 170 to permit the selector valve device 47 to return to its normal position shown in Fig. 6 for thereby opening the clutch control pipe 14 to atmosphere and the clutch control pipe 13 will also be open to atmosphere. On the other hand, if lever 17 is moved in a counterclockwise direction from the normal position shown in Fig. 1 the plunger 170 will actuate the lever 190a to operate in the valve mechanism 12, the selector valve device 48 for supplying fluid under pressure to the clutch control pipe 13 while permitting the selector valve device 47 to remain in its normal condition shown in Fig. 6 opening the clutch control pipe 14 to atmosphere. Return of the lever 17 to its normal position will allow the lever 190a to be returned to its normal position under the action of forces which return the parts of the selector valve device 48 to their normal position shown in Fig. 6 and above described, and under which condition the clutch control pipe 13 will be open to the atmosphere as well as the clutch control pipe 14.

Since the two control devices 10 and 11 are structurally identical as before pointed out, it will therefore be seen that movement of lever 20 in either one direction or the opposite direction for actuating the respective plunger 170 will operate the selector valve devices 47 and 48 in the valve mechanism 18 to either supply fluid under pressure to the clutch control pipe 21 or 22 while retaining the other pipe open to atmosphere, and to open both of said pipes to atmosphere in the normal position of said lever, in the same manner as just described in connection with operation of lever 17 to control the valve mechanism 12.

A cover 188 is secured to the top of the body by bolts 189 and is provided with two spaced slots 190 and 191 of identical contour and through which the operating bars 172 of the two levers 17 and 20, respectively, project to beyond the top of the body for operation by an operator. Above or outside of the cover a hand grip member 192 is secured to the end of each rod 172 by screw-threaded engagement. Below the screw-threaded portion of each hand-grip member 192 said member is in the form of a sleeve spaced from the rod 172 and terminating adjacent the top of the cover 188, and slidably mounted on said rod within the lower end of this sleeve portion of the grip is a detent 193 which is subject to the pressure of spring 194 within the grip portion for urging said detent into contact with the outer surface of the cover.

Each of the slots 190 and 191 comprises a central portion 197 extending parallel to the length of the plunger 170 which is connected to the lower end of the respective operating lever 17 or 20 to thereby provide for movement of said lever to shift said plunger axially for selectively operating the selector valve devices 47 and 48, this portion of the slot being of such length as to provide for such selective operation. In this portion 197 of each of the slots are three recesses 198, 199, and 200 for receiving the detent 193. The recess 198 is arranged to receive the detent 193 to define the normal position of the operating lever 17 or 20, in which position the respective selector valve devices 47 and 48 are conditioned to open the clutch control pipes 14 and 13, or 22 and 21, to atmosphere. The recess 199 is located to receive the detent 193 in the position of lever 17 or 20 required for actuating the respective selector valve device 47 to supply fluid under pressure to the clutch control pipe 14 or 22, while the recess 200 is positioned to receive the detent with the lever 17 or 20 in the position for operating the respective selector valve device 48 to supply fluid under pressure to the clutch control pipe 13 or 21.

Each of the slots 190 and 191 also comprises two portions 201 and 202 extending in opposite directions from recesses 199 and 200 at the opposite ends of the portion 197. The slot portion 201 of each slot provides from movement of lever 17 or 20 circumferentially of the shaft 155 for actuating through the medium of cam 154 the regulating screw 145 of the respective self-lapping valve mechanism while slot 190 provides for the same operation upon movement of the lever in the opposite direction from normal position of the lever.

The portions 201 and 202 of each of the slots 190 and 191 have beveled edges for frictional contact with the respective detent 193 in order that without manual force the operating lever 17 or 20 will remain in any selected position within these portions of the slots to which it may be moved by the operator.

From the above description it will now be seen that with the lever 17 in its neutral or normal position in which detent 193 is in recess 198 both selector valve devices 47 and 48 in the valve mechanism 12 will be conditioned to open their respective clutch control pipes 14 and 13 to the atmosphere and the regulating screw 145 of the self-lapping valve mechanism will be positioned to open the speed control pipe 16 to the atmosphere.

Movement of lever 17 from the position defined by recess 198 to that defined by recess 199 will operate the respective selector valve device 48 to supply fluid under pressure to the clutch control pipe 13 while maintaining the clutch control pipe 14 open to the atmosphere and also at this time screw 145 in the respective self-lapping valve mechanism will still be in the condition providing for opening of the speed control pipe 16 to the atmosphere. Subsequent movement of lever 17 from recess 199 into the portion 201 of the guide slot 190 will then operate screw 145 of the self-lapping valve mechanism to supply fluid to the speed control pipe 16 and timing chamber 8 at a pressure depending upon the extent of such movement while maintaining the selector valve devices conditioned as provided for in recess 199. Subsequent return of lever 17 to recess 199 will release fluid under pressure from the speed control pipe, while return to recess 198 will release fluid under pressure from the clutch control pipe 13 while retaining the clutch control pipe 14 open to atmosphere.

In case the operator moves the lever 17 into recess 200 the respective selector valve device 47 will be operated to supply fluid to the clutch control pipe 14 while selector valve device 48 will maintain the clutch control pipe 13 open to the atmosphere, and the speed control pipe 16 will also be maintained open to the atmosphere through the respective self-lapping valve mechanism due to the plunger 145 remaining in its normal condition. After the lever 17 has been moved into recess 200 it may then be moved into the portion 202 of slot 190 for actuating the plunger 145 of the respective self-lapping valve mechanism to supply fluid under pressure to the speed control pipe 16 and timing chamber 8 at a pressure depending upon the extent of movement into the portion 202 of said slot away from the recess 200. Return of the lever 17 through the portion 202 of the slot to recess 200 will cause operation of plunger 145 to release fluid under pressure from the speed control pipe 16, while return of the lever to recess 198 will cause operation of the respective selector valve device 48 to open the clutch control pipe 13 to atmosphere.

It will thus be seen that the operator may selectively supply fluid under pressure to either of the clutch control pipes 13 or 14 while retaining the other pipe open to atmosphere. Moreover, the speed control pipe 16 is maintained open to atmosphere until after the lever has been moved to the position for supplying fluid under pressure to the selected clutch control pipe, following which the lever may be operated to supply fluid to the speed control pipe, at a pressure depending upon the extent of movement of said lever away from recess 199 or 200.

The control valve device 11 as controlled by lever 20 is operative in the same manner as the control valve device 10 just described, for selectively controlling the pressure of fluid in the clutch control pipes 21 and 22 and in the speed control pipe 23 through the medium of valve mechanism 18, as will be apparent.

The improved control device while not limited in use, is particularly adapted for controlling the speed or power output of two internal combustion engines and the operation of two three position clutches, one clutch for connecting and disconnecting each engine to and from a device to be driven, such as the propeller of a ship. Each clutch may have a control element with a forward driving position, a reverse driving position, and a neutral or non-driving position and may be selectively movable to one or the other of said positions in accordance with the pressure of fluid in two pipes, in a manner and by means fully disclosed in the Stevens application hereinbefore referred. In the present application the pipes 13 and 14 may constitute clutch control pipes for controlling such a clutch for one engine, while the pipes 21 and 22 may constitute control pipes for controlling a like clutch for the other engine. The supply of fluid under pressure to either pipe 14 or pipe 22 may cause the respective clutch control element to move to its forward drive position while the supply of fluid under pressure to either pipe 13 or pipe 21 may cause the respective clutch control element to move to its reverse position. The opening of pipes 13 and 14, and pipes 21 and 22 to atmosphere may cause movement of the respective clutch control elements to their neutral positions.

The pipes 16 and 23 may constitute speed control pipes for the two engines, and the speed or power output of the engines may be varied directly in accordance with the pressure of fluid supplied to said pipes.

In controlling a ship provided with two engines and a propeller connected to each engine through a clutch, it will be seen that the speed and direction of rotation of each propeller may be individually adjusted by the control levers 17 and 20 of any improved controller. At times however it may be desired to use both engines for propelling the ship in either one direction or the other and this may require like adjustments of the two levers 17 and 20. Such like adjustments may be individually made by independent movement of the two levers, if such is desired. However, in order to facilitate like adjustments of the two levers 17 and 20, said levers are arranged in such proximity to each other that both may be grasped in one hand and operated in unison, to provide simultaneously and like adjustments of both clutches and of the speed of both engines.

If lever 17 is at the top of the portion 201 of slot 190, it will be noted that the respective selector valve device 47 will be supplying fluid under pressure to pipe 14 and that the plunger 145 in the control device 10 will be conditioned to supply a maximum degree of fluid pressure to the speed control pipe 16 which would cause operation of the respective engine at maximum speed to propel the ship, in for instance, a forward direction. In case the lever 17 is at the bottom of the portion 202 of slot 190, the engine would be caused to operate to propel the ship in an astern direction at full speed. The same also applies to lever 20 when disposed in either its uppermost or lowermost position, as viewed in Fig. 9, with respect to a propeller which may be controlled therefrom.

With the structure so far described the operator may move lever 17 or 20 out of portion 201 of the respective slot 190 or 191 into the recess 199 and then without hesitation through recess 198 into recess 200 and then into the portion 202 of said slot and to a desired position therein for obtaining a chosen engine speed. The movement of the lever out of the portion 201 of the slot into the recess 199 will release fluid under pressure from the speed control pipe 16 or 23 in order to provide for reducing the speed of the controlled engine to idling, and the movement from the recess 199 into the recess 200 will cause operation of the clutch to reverse the drive connection between said engine and the propeller. However, the mere venting of fluid under pressure from the speed control pipe 16 or 23 will not insure that the speed of the engine has been reduced to idling, or to some chosen low degree before reversing of the drive connection, due to inertia of moving parts in the engine which retards deceleration thereof. Thus with the structure as so far described, it would be possible for an operator to reverse the drive connection between a propeller and engine before the engine speed had become reduced to a chosen low degree, and this is undesirable for well known reasons.

In order to prevent supply of fluid under pressure to any one of the clutch control pipes 13, 14, 21 or 22 for effecting operation of a clutch to connect an engine to a device being driven, prior to the speed of said engine becoming reduced to a chosen low degree, which may even be some speed above idling. I provide an interlock arrangement to prevent movement of either lever 17 or lever 20 from one clutch engaging position, as in recess 199, to the other clutch engaging position, as in recess 200, with the engine operating above a chosen degree. This interlock arrangement will now be described.

The interlock arrangement comprises two similar but oppositely arranged plates 205 and 206 disposed within the cover 180 with their adjacent ends mounted on a pin 207 secured at one end in the body 1. Each plate has a slot 208 through which the pin 207 extends to provide for movement of the plate in the direction of lever 17 or lever 20. The pin 207 has a shoulder 209 on which the end of plate 205 rests, while the end of plate 206 rests on plate 205.

At the opposite end of plate 205 is a finger 210 arranged to be moved into and substantially across the path of movement of lever 17 between the two clutch engaging positions defined by recesses 199 and 200. When the finger 210 is positioned in the path of movement of lever 17 said lever cannot be moved from recess 199 to recess 200 or from recess 200 to recess 199. The slot 208 in the plate 205 provides however for shifting of the plate and finger 210 to allow movement of the lever 17 out of recess 199 substantially into the recess 198 or out of recess 200 substantially into recess 198. Thus, when the finger 210 is in the path of movement of lever 17, said lever can be moved out of either clutch engaging position, but it cannot be moved from one clutch engaging position to the other, neither can it be moved fully into the recess 198. The controller is so designed and adjusted however that with the lever 17 moved against the finger 210 in either direction as far as it will go, both of the clutch control pipes 13 and 14 will be opened to the atmosphere, so that if the controller is connected for controlling a clutch as above described, the clutch control element may be moved from either of its driving positions to its neutral or non-driving position.

The plate 206 has a finger 211 arranged to cooperate with the control lever 20 in the same manner as finger 210 cooperates with the control 17, as just described.

Disposed in the space between the two control levers 17 and 20 and extending at right angles to the back leg 3 of the body is a cover plate 213 secured to the body at its center by the screw 207 and at the opposite ends by screws 214. At one side of pin 207 the cover 213 cooperates with the body leg 2, to clamp a flexible diaphragm 215 around its marginal edge. At the opposite side of pin 207 a like diaphragm 216 is clamped around its marginal edge between the body leg 2 and cover 213.

The diaphragm 215 has at one side a pressure chamber 217 which is in constant communication through a passage 218 with the timing chamber 9. The diaphragm 216 has a pressure chamber 219 at one side which is open through a passage 220 to the timing chamber 8. At the opposite side of diaphragm 215 is a non-pressure chamber 221 containing a diaphragm follower 222 one face of which is in contact with the diaphragm. Projecting from the opposite face of the diaphragm follower 222 is an operating stem 223 which extends through a suitable bore in the cover 213 to a point beyond the upper surface thereof. A similar follower 224 contacts the opposite side of diaphragm 216 in a non-pressure chamber 225 and has a stem 226 slidably mounted in a suitable bore in cover 213 and projecting beyond the top surface thereof.

Between pin 207 and diaphragm operating stem 223 the cover 213 is provided with two upstanding lugs 227 carrying a pin 228 on which is pivotally mounted the knee of a bell crank 229. This bell crank has one arm 230 extending over the diaphragm operating stem 223, and in the end of said arm is an adjusting screw 231 arranged to engage the end of said stem. A lock nut 232 on screw 231 is provided for contact with arm 230 to secure the adjusting screw in an adjusted position. The bell crank also has a vertically extending arm 233 on the end of which is provided a spherical-like bearing member 234 which is disposed in a slot 235 provided in plate 206 at one side of pin 207, said slot extending parallel to slot 208 in said plate. The bell crank 229 has a third arm 236 extending around one side of the pin 207, and in the end of this arm is secured a button 237 over which fits one end of a coil spring 238, the opposite end of which is supported in a recess in cover 213. The spring 238 is under pressure and therefore effective to rock the bell crank arm 233 in a clockwise direction, as viewed in Fig. 2, against the diaphragm follower stem 223. With the pressure chamber 217 below diaphragm 215 open to atmosphere by way of timing chamber 9 and thereby the speed control pipe 23 as above described, the spring 238 is rendered effective to rock the plate 206 in a counterclockwise direction about pin 207, as viewed in Fig. 10, to a position in which finger 211 is pulled out of the path of movement of operating lever 20 in order to allow movement of said lever through its neutral position to either of the recesses 199 or 200.

When fluid under pressure is supplied to the speed control pipe 23 and through choke 37 to the timing chamber 9, as above described, such pressure is effective through passage 218 in chamber 217 and thereby acts on diaphragm 215 and bell crank 229 in opposition to the pressure of spring 238. When the fluid pressure obtained in chamber 217 is increased to a degree sufficient to overcome spring 238, diaphragm 215 will be deflected and rock the bell crank 229 in a counterclockwise direction as viewed in Fig. 2, and this movement will move the upper end of the bell crank arm 233 in the direction of the pin 207 and thereby rock the plate 206 about said pin in a clockwise direction, as viewed in Fig. 10, and move the finger 211 into the path of movement of lever 20 between recesses 199 and 200, and when thus positioned, said finger will prevent movement of the lever 20 from recess 199 to recess 200, or vice versa, but will allow movement of the lever out of either of said recesses substantially into recess 198, as hereinbefore described.

Upon subsequent release of fluid under pressure from the speed control pipe 23, the pressure of fluid in chamber 9 and thereby in chamber 217 below the diaphragm 215 will gradually reduce through choke 37 into said pipe and when thus reduced to a sufficient degree, spring 238 will rock the bell crank 229 to pull finger 211 out of the path of movement of lever 20. Thus, if the control device 11 is applied for controlling a three position clutch and the speed of an engine connected to the clutch as above described, the lever 20 cannot be moved from recess 199 to recess 200, or vice versa, for a certain period of time after the lever 20 is returned to the central portion 197 of the slot 190, said time period being determined by the rate of reduction in pressure in timing chamber 9 through choke 37 and the relative force of spring 238 which effects movement of the finger 11 out of the path of movement of lever 20. The spring 238, the volume of timing chamber 9 and the capacity of choke 37 may be so related as to block movement of the lever 20 to effect reversal of the clutch drive until the engine speed is reduced to idling or to any other chosen relatively low degree.

The diaphragm follower stem 226 acts against one end of a lever 240 through the medium of an adjusting screw 241 which is secured in an adjusted position in the end of said lever by a lock nut 242. The lever 240 constitutes one arm of a bell crank 239 which is substantially the same as bell crank 229 and which is pivoted at its knee on a pin 243 carried in two lugs 244 projecting upwardly from the cover 213. The bell crank 239 also has an arm 245 extending upwardly and provided on its end with a spherical-like bearing member 246 which is disposed to work in a slot 247 provided in plate 205, the slot 247 corresponding to slot 235 in plate 206 and being arranged parallel to the slot 208. The bell crank 239 also has an arm 248 extending around pin 207 at the opposite side from arm 236, and interposed between the end of arm 248 and the cover 213 is a spring 249 under pressure. This spring is effective to rock plate 205 in a counterclockwise direction about the pivot pin 207, as viewed in Fig. 10, for pulling the finger 210 out of the path of movement of lever 17, when the pressure of fluid in the diaphragm chamber 219 and in the connected timing chamber 8 is reduced to a chosen low degree by venting through the control choke 36, as hereinbefore described.

Upon supply of fluid under pressure to the speed control pipe 16 and to the timing chamber 8 said pressure acts on diaphragm 216 in chamber 219 and when this pressure becomes sufficient to overcome the opposing force of spring 249 said diaphragm will be deflected to operate the bell crank 239 and rock plate 205 in a clockwise direction, as viewed in Fig. 10, to thereby move finger 210 into the path of movement of lever 17 for preventing movement of said lever from recess 199 to recess 200, or vice versa, for the same reason as above described. Upon a subsequent reduction in the pressure in timing chamber 8 and in diaphragm chamber 219 to a sufficiently low degree, by way of choke 36 and speed control pipe 16, the spring 249 will rock the bell crank 240 and thereby plate 205 to pull the finger 210 out of the path of movement of lever 17, to thereby free said lever for movement from recess 199 to recess 200, or vice versa, as will be readily apparent. The choke 36 is effective to so delay the reduction in pressure in the timing chamber 8 and acting on diaphragm 216, that finger 210 will not be pulled from the path of movement of lever 17 for a period of time, which will ensure the desired deceleration of the engine before allowing operation of said lever to effect reversal of the clutch drive.

The time period between movement of either lever 17 or 20 out of the portions 201 or 202 and into the portions 197 and then to the opposite ends of the portions 197 of slots 190 and 191, respectively, for effecting reversal of the clutch drive will vary directly according to the degree of pressure existing in the timing reservoirs 8 and 9, and therefore in accordance with the speed of the engine at the time the operator moves the lever or levers 17 and 20 to the central portion 197 of said slots, so as to thereby insure the desired deceleration of the engines, before reversing of their drive connections, regardless of the previous speed of the engines.

As before mentioned, reversal of the engine drive connections may be considered satisfactory when the engines are operating at a speed somewhat exceeding idling and as determined by a position of the respective levers 17 or 20 slightly out of the central portions 197 of slots 190 and 191, respectively. This would obviously require movement of fingers 210 and 211 out of the path of movement of the levers when the pressure in the timing chambers 8 and 9 was reduced to a degree provided with the levers slightly out of the central portions 197 of the slots 190 and 191, respectively, as just mentioned. Such movement may be obtained by the use of springs 238 and 249 exerting a slightly greater force on bell cranks 229 and 239, respectively, than required to obtain deceleration of the engines to idling speed. The use of chokes 36 and 37 having a slightly increased venting capacity may also accomplish substantially the same result as stronger springs 229 and 239.

It will be noted that if either lever 17 or 20 is moved out of either portion 201 or portion 202 into the portion 197 of the respective slot 190 or 191, and the operator then desires to return the lever to the position from which it was moved without having reversed the drive connection with the respective engine, he may do this at will and without any interference from fingers 210 or 211.

*Summary*

It will now be seen that I have provided an improved manually operative controller embodying two control devices each for controlling a plurality of operations, such as the selective positioning of a three position clutch and the regulation of the speed of an internal combustion engine. The control lever of each device is confined to a path of movement which insures supply of fluid under pressure to a selected one of two clutch control pipes to effect engagement of a clutch before fluid under pressure can be supplied to a third pipe for accelerating an engine, and conversely, provides for release of fluid under pressure from said third pipe to provide for reducing the speed of the engine before releasing fluid under pressure from the clutch control pipe to release the clutch. In order to insure that an operator cannot reverse the drive connection of the clutch with the engine operating at a speed above a chosen degree, an interlock is provided to prevent movement of the lever from one clutch engaging position to the other with the engine operating above such speed. This interlock is automatic in operation in accordance with the speed condition of the engine and allows for movement of the control lever to change the drive condition of the clutch only when the engine speed is reduced to the chosen degree.

Each control device embodies a self-lapping valve structure for regulating the pressure of fluid supplied to the speed control pipe. Relatively small manual effort is required for operating this structure since manual operation of the control lever is opposed by only a portion of controlling forces governed by the control spring 111 and acting on one side of the plunger 123.

Each control device also embodies selector valve devices 47 and 48 having a novel double check valve arrangement which provides for closure of one check valve ahead of opening of the other check valve, or vice versa, so as to insure positive operation of the device being controlled and also to prevent loss of fluid under pressure during a valve shifting operation.

The improved manually operative controller while embodying only one body and one cover constitutes however two independent control devices for controlling separate and independent valve structures. Each of the control devices is capable of operation independently of the other, but both are arranged for operation in unison if such is desired.

While only one embodiment of the invention has been described in detail, it is not the intention to limit the scope to that embodiment or otherwise than by the terms of the appended claims.

Having now described my invention, what I claim as new and desire to secure by Letters Patent is:

1. A mechanism for controlling operation of a plurality of independently operative devices comprising in combination, a rockable shaft operable upon rocking to control one of said devices and having an axial bore, a plunger slidably mounted in said bore, a lever having connections with said shaft and plunger and operable upon movement in a direction circumferentially of said shaft to rock same and upon movement in the direction of one end of said shaft to move said plunger axially in one direction relative to said shaft and upon movement in the reverse direction to move said plunger axially in the opposite direction relative to said shaft, means operable upon movement of said plunger in one direction in said shaft to actuate a second one of said devices and in the opposite direction in said shaft to actuate a third one of said devices, and means cooperative with said lever rendering same operative to rock said shaft in positions of said lever in which said second or third device is actuated and rendering said lever non-operable to rock said shaft when said lever is out of said positions.

2. A control mechanism comprising a body, a structure embodying three separate and independent devices removably mounted on said body, a rockable shaft journaled in said body, a cam associated with said shaft and operable upon rocking of said shaft in one direction from a normal position to effect operation of one of said devices, and in the opposite direction from normal position to also effect operation of said one device, a longitudinally movable plunger carried by said body, a lever carried by said structure and operatively connecting said plunger to a second one of said devices, another lever carried by said structure operatively connecting said plunger to the third device, and a control lever having connections with said shaft and plunger providing for rocking of said shaft upon movement of said control lever in either direction circumferentially of said shaft and providing for longitudinal movement of said plunger relative to said shaft upon movement of said lever in either one direction or in the opposite direction relative to said shaft longitudinally thereof.

3. A control mechanism comprising in combination, a body, a structure removably mounted on said body and embodying three separate and independent devices each having an operating plunger, the plungers of two of said devices being arranged parallel and opposite to each other and the third plunger being arranged to move at right angles to the axes of the plungers of the two devices, a shaft journaled in said body parallel to the two plungers, a cam on said shaft operable upon rocking of said shaft in either direction from a neutral position to effect operation of said third plunger, a longitudinally movable control plunger carried by said body, a lever carried by said structure connecting one end of said control plunger to the operating plunger of one of said two devices, another lever carried by said structure connecting the opposite end of said control plunger to the operating plunger of the other of said two devices, said control plunger being operable upon axial movement in one direction to a first position to effect operation of one of said levers and of the operating plunger of the device connected thereto, and upon movement in the opposite direction relative to said shaft to a second position to effect operation of the other of said levers and of the operating plunger of the device connected thereto, said control plunger having a third position intermediate said first and second positions, a lever connected to said shaft and control plunger for actuating same, and means cooperative with said lever providing for movement thereof to rock said shaft out of said neutral position only with said control plunger in said first and second positions.

4. A control means comprising a body, a control device, means removably securing said device on said body, a manually operable control lever for said control device for controlling operation thereof, means supported in said body carrying said control lever, said control device comprising a first control means and a second control means, means carried by said body independently of said control device operatively connecting said first control means to said control lever for control thereby, and means carried by said control device operatively connecting said second control means to said control lever for control thereby.

HARRY C. MAY.

REFERENCES CITED

The following references are of record in the file of this patent:

UNITED STATES PATENTS

| Number | Name | Date |
|---|---|---|
| D. 132,723 | Panish | June 9, 1942 |
| 635,816 | Sperry | Oct. 31, 1899 |
| 942,065 | Grebel | Dec. 7, 1909 |
| 1,091,160 | Phillips | Mar. 24, 1914 |
| 1,667,842 | Coykendall | May 1, 1928 |
| 1,775,881 | Wright | Sept. 16, 1930 |
| 1,814,565 | Lombard | July 14, 1931 |
| 1,825,577 | Carr | Sept. 29, 1931 |
| 1,843,425 | Karsten | Feb. 2, 1932 |
| 1,855,988 | Ranasey | Apr. 26, 1932 |
| 1,927,700 | Dickinson | Sept. 19, 1933 |
| 2,025,440 | Carmody | Dec. 24, 1935 |
| 2,082,410 | McCauley | June 1, 1937 |
| 2,123,020 | Phillips | July 5, 1938 |
| 2,144,616 | Carlson | Jan. 24, 1939 |
| 2,205,300 | Marsh | June 18, 1940 |
| 2,225,082 | Orshansky et al. | Dec. 17, 1940 |
| 2,235,858 | Williams | Mar. 25, 1941 |
| 2,271,833 | Shipman | Feb. 3, 1942 |
| 2,276,979 | Jacobi | Mar. 17, 1942 |
| 2,297,422 | Mobine et al. | Sept. 29, 1942 |
| 2,314,842 | Hedemann et al. | Mar. 23, 1943 |
| 2,325,333 | McKendrick | July 27, 1943 |
| 2,326,796 | Panish | Aug. 17, 1943 |
| 2,330,388 | Scott-Paine | Sept. 28, 1943 |

FOREIGN PATENTS

| Number | Country | Date |
|---|---|---|
| 28,535 | France | Nov. 26, 1924 |
| 121,652 | Germany | June 20, 1901 |
| 420,477 | France | Jan. 31, 1911 |
| 644,255 | Germany | Apr. 27, 1937 |
| 665,915 | France | May 13, 1909 |